US008073340B2

(12) United States Patent  
Ishaug et al.

(10) Patent No.: US 8,073,340 B2
(45) Date of Patent: Dec. 6, 2011

(54) DISTORTION COMPENSATION CIRCUIT INCLUDING ONE OR MORE PHASE INVERTIBLE DISTORTION PATHS

(75) Inventors: Brian Ishaug, Sugar Land, TX (US); Jun Zheng, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 857 days.

(21) Appl. No.: 12/026,182

(22) Filed: Feb. 5, 2008

(65) Prior Publication Data

US 2009/0196630 A1    Aug. 6, 2009

(51) Int. Cl.
*H04B 10/02* (2006.01)

(52) U.S. Cl. .......................... 398/193; 398/147; 398/194

(58) Field of Classification Search .......... 398/147–148, 398/150, 156, 193–194, 199
See application file for complete search history.

(56) References Cited

U.S. PATENT DOCUMENTS

| | | | |
|---|---|---|---|
| 4,068,186 A | 1/1978 | Sato et al. | |
| 4,992,754 A | 2/1991 | Blauvelt et al. | |
| 5,132,639 A | 7/1992 | Blauvelt et al. | |
| 5,252,930 A | 10/1993 | Blauvelt | |
| 5,321,710 A | 6/1994 | Cornish et al. | |
| 5,361,156 A * | 11/1994 | Pidgeon | 398/193 |
| 5,418,637 A | 5/1995 | Kuo | |
| 5,424,680 A * | 6/1995 | Nazarathy et al. | 330/149 |
| 5,436,749 A | 7/1995 | Pidgeon, Jr. et al. | |
| 5,481,389 A * | 1/1996 | Pidgeon et al. | 398/208 |
| 5,600,472 A | 2/1997 | Uesaka | |
| 5,703,530 A | 12/1997 | Sato et al. | |
| 6,055,278 A | 4/2000 | Ho et al. | |
| 6,061,161 A | 5/2000 | Yang et al. | |
| 6,122,085 A | 9/2000 | Bitler | |
| 6,133,790 A | 10/2000 | Zhou | |
| 6,388,518 B1 | 5/2002 | Miyatani | |
| 6,741,128 B2 * | 5/2004 | Okubo et al. | 330/149 |
| 6,757,525 B1 * | 6/2004 | Ishikawa et al. | 455/114.3 |
| 6,759,897 B2 | 7/2004 | Ciemniak | |
| 6,917,764 B1 | 7/2005 | Wilson | |
| 6,919,765 B2 | 7/2005 | Zappala | |

(Continued)

OTHER PUBLICATIONS

International Search Report and Written Opinion dated Mar. 30, 2009 issued in related International Patent Application No. PCT/US2009/033175.

(Continued)

*Primary Examiner* — Dzung Tran
(74) *Attorney, Agent, or Firm* — Grossman Tucker Perreault & Pfleger, PLLC; Norman S. Kinsella (57) ABSTRACT

A distortion compensation circuit compensates for distortion generated by one or more non-linear elements such as a laser device and may include a primary signal path for carrying an input signal and one or more secondary signal paths for generating distortion. The distortion compensation circuit may also include one or more controllable phase inverters on at least one of the paths. For example, the secondary signal path may include a distortion generator to produce distortion products from the input signal and a signal controlled phase inverter that inverts the phase of the distortion products. The distortion generator and phase inverter may be combined as an invertible distortion generator. The phase inversion may be controlled in response to a phase inversion control signal generated based on one or more parameters such as temperature. The secondary signal path may also include separate distortion sub-paths to produce frequency independent distortion products and frequency dependent distortion products.

28 Claims, 8 Drawing Sheets

U.S. PATENT DOCUMENTS

| | | | |
|---|---|---|---|
| 6,943,628 | B2 | 9/2005 | Weldon |
| 7,466,925 | B2 | 12/2008 | Iannelli |
| 7,925,170 | B2 | 4/2011 | Ishaug |
| 2001/0054927 | A1 | 12/2001 | Zhou et al. |
| 2009/0196629 | A1* | 8/2009 | Zheng et al. .......... 398/193 |

OTHER PUBLICATIONS

Applied Optoelectronics, Inc., "DFB-1310-P3-xx-A3-xx Laser Module", Applied Optoelectronics, Inc. 2006, pp. 1-6.

Applied Optoelectronics, Inc., "DFB-1310-P2-xx-A3-xx Predistorted Laser Transmitter", Applied Optoelectronics, Inc. 2005, pp. 1-5.

Applied Optoelectronics, Inc., "DFB-1xxx-P3-xx-A3-xx Laser Module", Applied Optoelectronics, Inc. 2006, pp. 1-8.

Office Action dated Mar. 3, 2011 received in U.S. Appl. No. 12/025,883.

Linear Technology, "LT5534 -50 MHz to 3GHz RF Power Detector with 60dB Dynamic Range," available at http://cds.linear.com/docs/Datasheet/5534fc.pdf, retrieved on Jul. 27, 2011.

CISCO, "Prisma ll 1 GHz SuperQAM Transmitter," available at www.cisco.com/en/US/prod/collateral/video/ps8806/.../7019211b.pdf, retrieved on Jul. 27, 2011.

Scientific Atlanta, "Optoelectronics Prisma ll 1 GHz 1550 nm Transmiters," available at http://tulsat.com/productImages/DownloadFiles/1GHz_1550.pdf: retrieved on Jul. 27, 2011.

Office Action dated Mar. 8, 2010 received in U.S. Appl. No. 11/834,873.

Notice of Allowance dated Dec. 8, 2010 received in U.S. Appl. No. 11/834,873.

\* cited by examiner

DISTORTION COMPENSATION CIRCUIT INCLUDING ONE OR MORE PHASE INVERTIBLE DISTORTION PATHS

TECHNICAL FIELD

The present invention relates to distortion compensation circuits and more particularly, to distortion compensation circuits including one or more phase invertible distortion paths.

BACKGROUND INFORMATION

A directly modulated laser may be used as an optical transmitter that transmits light at a given wavelength. The power (i.e., amplitude) of the laser light is modulated by corresponding modulation of the current used to drive the laser. For example, the optical transmitter may be modulated to carry a wide-band RF signal. In this case, the electrical current that drives or pumps the laser is modulated with the wide-band RF signal.

The use of a directly-modulated laser to carry a wide-band RF signal may result in distortion due to the multiple carrier frequencies of the multichannel RF signal modulating the laser and/or the harmonics produced by the non-linear nature of the laser device. Intermodulation distortion may be produced when two or more signals (e.g., 2 or more carriers) mix together to form distortion products. Discrete distortion may be produced from only one carrier. Distortion may include even-order distortion and odd-order distortion. In a CATV system, the most significant types of even-order and odd-order distortion products are second-order distortion products and third-order distortion products, respectively. Second-order intermodulation ($IM_2$) distortion products may include, for example, intermodulation products formed by combining signals at frequencies A and B to produce new signals at the combined frequencies, such as A±B. Third-order intermodulation ($IM_3$) distortion products may include, for example, intermodulation products formed by combining signals at frequencies A, B, and C to produce new signals at frequencies A±B±C and 2A±B.

In a CATV system, there are a multitude of carriers spaced equally in frequency, which may produce numerous intermodulation distortion products that lie at the same frequency. The sum of second-order intermodulation products that are present at a particular frequency is commonly referred to as composite second order (CSO) distortion. In a CATV system, the equal spacing of the carriers may also cause multiple third-order intermodulation products to line up at the same frequency and directly on top of the carrier frequency. The sum of these third-order intermodulation products that are present in a particular channel is commonly referred to as composite triple beat (CTB) distortion.

The non-linearities of a time-independent non-linear element, such as an amplifier, may be modeled as Taylor series expansions or power series expansions of an input signal. For example, the output y of a non-linear amplifier may be described as a Taylor series expansion of an input x:

$$y(x) = C_o + C_1 x + C_2 x^2 + C_3 x^3 + C_4 x^4 + \ldots C_k x^k \qquad \text{Eq. 1}$$

where $C_0, C_1, C_2, C_3, C_4, \ldots C_k$ are constants representative of the behavior of the non-linear amplifier. The order within the series is determined by the highest power of x in the expansion. The even order ($x^{2n}$ where n=1, 2, 3 ...) terms in the series (e.g., $C_2 x^2$, $C_2 x^4$, $C_2 x^6$, ...) represent even order distortion and the odd order ($x^{2n+1}$ where n=1, 2, 3 ...) terms in the series (e.g., $C_2 x^3$, $C_2 x^5$, $C_2 x^7$, ...) represent odd order distortion. For example, $C_2 x^2$ is the second-order term and represents distortion from the first of the even order terms and $C_3 x^3$ is the third-order term and represents distortion from the first of the odd order terms. When the input x is an RF input, both x and y are time-varying quantities. With an input having two angular frequencies ($\omega_1$ and $\omega_2$) represented as x=a sin($\omega_1 t$)+b sin($\omega_2 t$), the second order term $C_2 x^2$ creates second order distortion products at frequencies $2\omega_1$, $2\omega_2$, $\omega_1 - \omega_2$, and $\omega_1 + \omega_2$. Because the non-linear element in this case is time independent, the magnitude and phase of these distortion products are not dependent upon the modulation frequency.

When the non-linear element also has time dependence, such as for lasers, the Taylor series is expanded to include the time dependent terms as follows:

$$\begin{aligned} y(x(t)) = &\; C_{00} + C_{01}x + C_{02}x^2 + C_{03}x^3 + \ldots C_{0k}x^k + \\ & C_{11}\frac{dx}{dt} + C_{12}x\frac{dx}{dt} + C_{13}x^2\frac{dx}{dt} + \ldots C_{1k}x^{k-1}\frac{dx}{dt} + \\ & C_{21}\frac{d^2 x}{dt^2} + C_{22}x\frac{d^2 x}{dt^2} + C_{23}x^2\frac{d^2 x}{dt^2} + \ldots C_{2k}x^{k-1}\frac{d^2 x}{dt^2} + \\ & C_{n1}\frac{d^n x}{dt^n} + C_{n2}x\frac{d^n x}{dt^n} + C_{n3}x^2\frac{d^n x}{dt^n} + \ldots C_{nk}x^{k-1}\frac{d^n x}{dt^n} \end{aligned} \qquad \text{Eq. 2}$$

When an input having two angular frequencies ($\omega_1$ and $\omega_2$) represented as x=a sin($\omega_1 t$)+b sin($\omega_2 t$) is applied to the above time dependent non-linear element, the second order distortion at frequencies $2\omega_1$, $2\omega_2$, $\omega_1 - \omega_2$, and $\omega_1 + \omega_2$ will have an amplitude and phase that is dependent on frequency. For the $2\omega_1$ term, the dependence may be represented as follows:

$$y_{2\omega_1} = \frac{a^2}{2}[C_{02}\cos(2\omega_1 t) + C_{12}\omega_1 \sin(2\omega_1 t) - C_{22}\omega_1^2 \cos(2\omega_1 t) + \ldots] \qquad \text{Eq. 3}$$

The first term in the above series represents the frequency independent term. The remaining terms represent frequency dependent terms that are a result of the time dependence upon distortion. A similar dependence can be found for other second order distortion products.

For any given non-linear element, such as a laser, the magnitude and sign of the coefficients of the time dependent Taylor series expansions are often unknown. Furthermore, the magnitude and sign of the coefficients can change with parameters such as laser power or temperature. When multiple non-linear elements are present in a system, such as the case for hybrid fiber coax transmission systems using direct modulated lasers, the coefficients of the Taylor series expansion describing the system will be related to the sum of the respective coefficients describing the non-linear elements within the system. Other non-linear elements in a hybrid fiber coax transmission system could be, for example, the fiber used to transmit the optical signal. The result of summing these coefficients is that not only is the magnitude of the system coefficients often unknown, so is the sign. Also both magnitude and sign of the system coefficient can change with system parameters.

Several techniques have been proposed or employed to compensate for distortion by injecting distortion of equal magnitude but opposite phase to the distortion produced by the laser device. For example, a predistortion circuit may be employed to predistort the RF signal being applied to modulate the laser. One such predistortion circuit includes split signal paths—a main or primary signal path and a secondary signal path. A small sample of the RF input is tapped off the main signal path and a distortion generator in the secondary signal path generates distortion (i.e., predistortion). The predistortion is then recombined with the RF signal on the main signal path such that the predistortion is of equal magnitude but opposite sign to the laser-induced distortion.

These predistortion circuits have been proposed or employed using frequency independent magnitude adjustments in the secondary path and even magnitude-phase tilt filters to account for the frequency dependent effects. However, such existing predistortion circuits may not be effective to compensate for element and/or system distortion both initially and/or during operation and/or with changes in system parameters. One of the reasons may be the inability to change the phase of the secondary path(s) by 180° to account for the possibility that the coefficients or sum of coefficients of the time dependent Taylor series expansion will change signs.

BRIEF DESCRIPTION OF THE DRAWINGS

These and other features and advantages will be better understood by reading the following detailed description, taken together with the drawings wherein.

DETAILED DESCRIPTION

A distortion compensation circuit, consistent with embodiments of the present invention, may be used with one or more non-linear elements, such as a laser, to compensate for distortion generated by the non-linear element(s), for example, in broadband applications. As will be described in greater detail below, embodiments of the distortion compensation circuit may include one or more phase invertible distortion paths that produce distortion products for which the phase may be controllably inverted. The distortion compensation circuit may include, for example, a frequency independent distortion path and a frequency dependent distortion path to produce distortion that compensates for frequency dependent distortion generated by the non-linear element(s).

Distortion compensation circuits may include predistortion circuits, which generate compensating distortion before the non-linear element(s), for example, in an optical transmitter. Distortion compensation circuits may also include postdistortion circuits, which generate compensating distortion after the non-linear element(s), for example, in an optical receiver. Although some of the exemplary embodiments may refer specifically to predistortion circuits, the concepts described herein may be used with predistortion compensation, postdistortion compensation, or a combination thereof. Thus, distortion compensation circuits, consistent with the embodiments described herein, may be used to compensate for distortion produced by one or more non-linear elements before and/or after the distortion compensation circuits.

Figure 1:
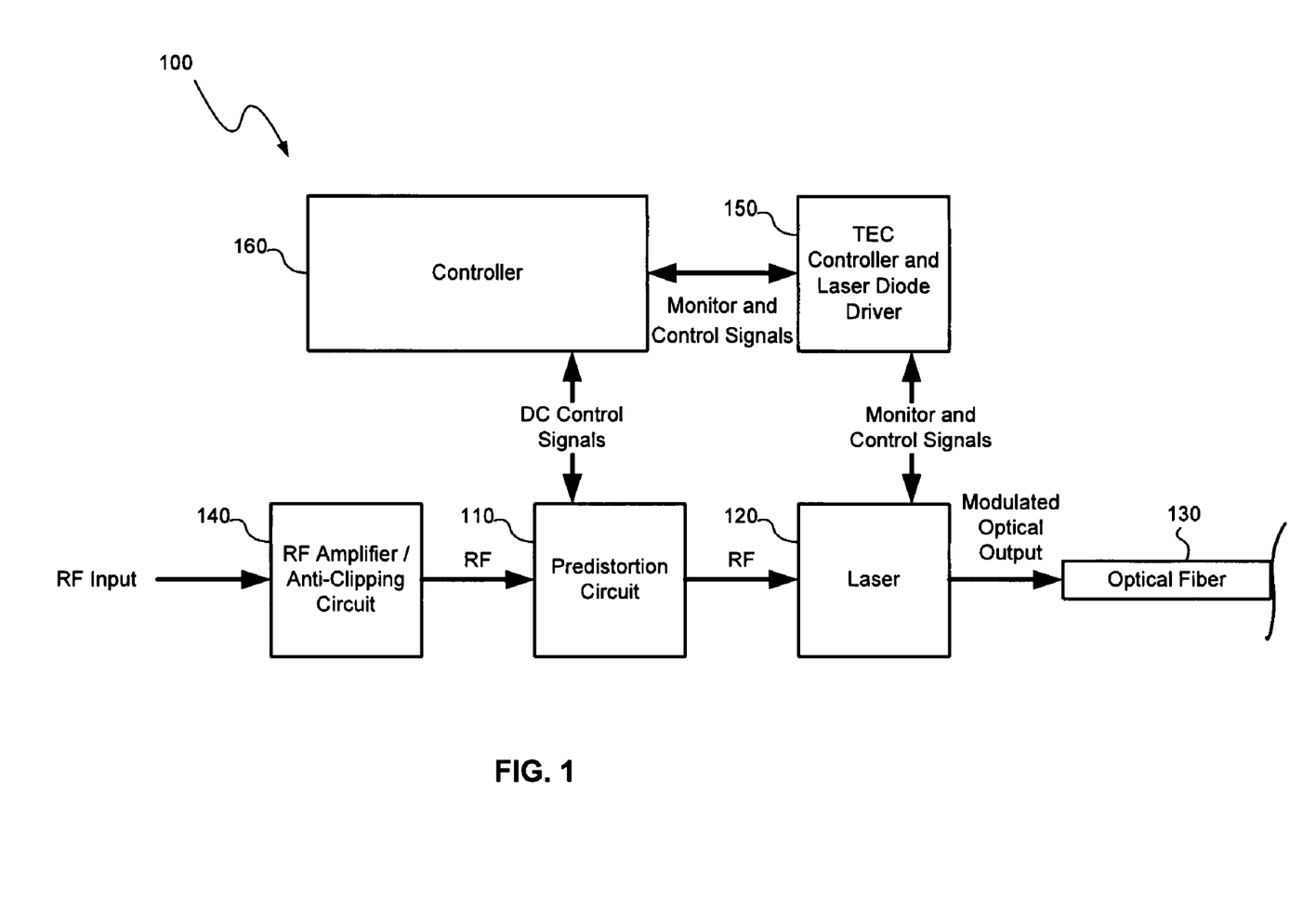
FIG. 1 is a schematic diagram of an optical transmitter including a predistortion circuit, consistent with one embodiment of the invention.

Referring to FIG. 1, an optical transmitter 100 may include a predistortion circuit 110 to generate predistortion that compensates for distortion produced by one or more non-linear elements, such as a laser 120 and/or an optical fiber 130 when a RF signal modulates the laser 120 to produce a modulated optical output coupled into the optical fiber 130. As used herein, "compensate" or "compensating" for distortion means reducing distortion to a point that is tolerable in a particular system and does not necessarily require elimination of distortion. To compensate for distortion produced by the laser 120, the predistortion may be generated by the predistortion circuit 110 with a magnitude substantially equal to the magnitude of the distortion produced by the laser 120 and a phase that is substantially opposite the phase of the distortion produced by the laser 120, optical fiber 130 and/or other non-linear elements such as amplifier non-linearities.

According to one embodiment, the optical transmitter 100 may include RF amplifier/anti-clipping circuit 140 to receive and amplify the RF input signal (e.g., a multi-channel carrier multiplex signal) and/or to modify the RF input signal to prevent or reduce clipping in the laser 120. One example of an anti-clipping circuit is the type described in greater detail in commonly-owned U.S. patent application Ser. No. 11/753,082, which is incorporated herein by reference. The predistortion circuit 110 may then receive the amplified RF signal, generate the predistortion and combine the predistortion with the RF signal that modulates the laser 120. The laser 120 may be a directly-modulated electrically pumped semiconductor laser, such as a laser diode.

One embodiment of the optical transmitter 100 may further include thermoelectric cooler (TEC) controller and laser diode driver circuitry 150 to control the temperature of and to bias the laser 120. A controller 160, such as a microprocessor, may be used to control the components and the operation of the optical transmitter 100. The TEC controller and laser diode driver circuitry 150 and the microcontroller 160 may include components known to those skilled in the art for use in a laser transmitter, such as the type available from Applied Optoelectronics, Inc.

One example of an optical transmitter 100 is a laser transmitter designed for forward-path CATV applications. In such "broadband" applications, the optical transmitter 100 and particularly the laser 120 may be designed for high frequency operation, for example, up to about 1 GHz. The embodiments described herein have particular application in hybrid fiber coaxial transmission systems for the reduction of CSO distortion in broadband carrier multiplexed transmissions, although they could be applied to any situation in which the reduction of even order distortion is desired for a particular class of non-linear effects. The distortion compensation circuits and methods described herein may also be used in other applications (e.g., using different or even higher frequencies) and/or with other types of optical transmitters. Embodiments of the distortion compensation circuits may also be used with any non-linear element or device that generates distortion that can be compensated with predistortion or postdistortion.

Figure 2:
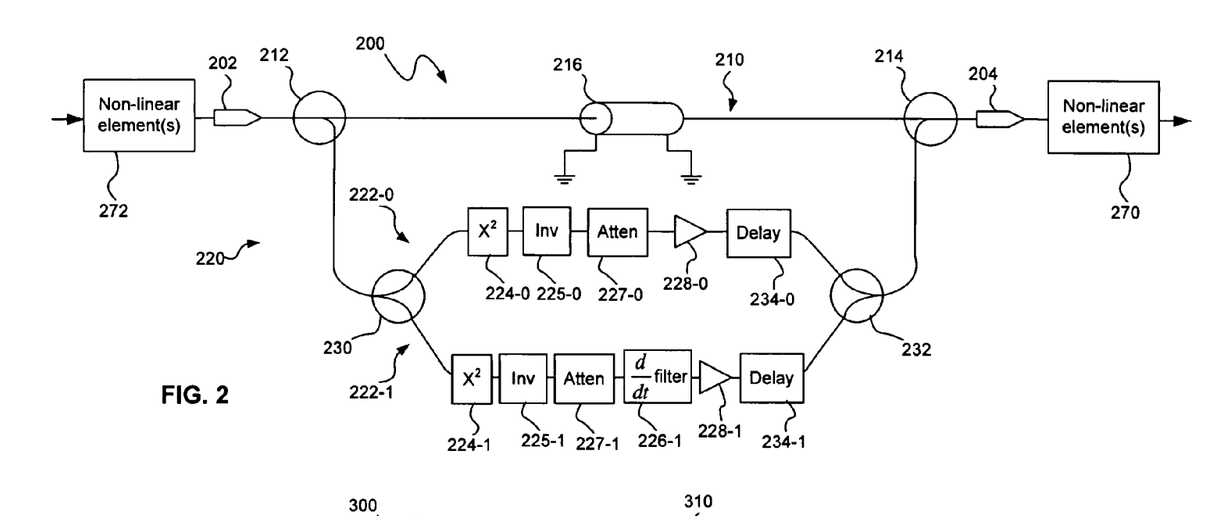
FIG. 2 is a schematic diagram of a distortion compensation circuit including invertible distortion paths, consistent with one embodiment of the invention.

Referring to FIG. 2, a distortion compensation circuit 200, consistent with an embodiment of the present invention, is described in greater detail. The distortion compensation circuit 200 receives a RF input signal at a signal input 202, generates compensating predistortion and/or postdistortion, and provides the RF signal combined with the compensating predistortion and/or postdistortion at a signal output 204. The distortion compensation circuit 200 may include a primary signal path 210 and a secondary signal path 220 that are coupled together, for example, using directional couplers such as a directional splitter 212 and a directional combiner 214. At the directional splitter 212, at least a portion of the RF input signal power is received on the primary and secondary signal paths 210, 220, respectively.

The secondary signal path 220 produces intermodulation distortion products from the RF input signal received on the secondary signal path 220. In the exemplary embodiment, the distortion compensation circuit 200 compensates for composite second order (CSO) distortion and the secondary signal path 220 produces second-order intermodulation distortion products. The distortion compensation circuit 200 may also compensate for composite triple beat (CTB) distortion in addition to or instead of CSO by producing third-order intermodulation distortion products on the secondary signal path 220 or another signal path. Similarly, higher orders of intermodulation distortion may also be compensated.

At the directional combiner 214, intermodulation distortion products produced on the secondary signal path 220 are combined with the RF input signal on the primary signal path 210 with a desired magnitude and phase to compensate for distortion. Where the distortion compensation circuit is a predistortion circuit, the intermodulation distortion products provide compensating predistortion combined with the RF signal to produce a predistorted RF signal that compensates for distortion generated by one or more non-linear elements 270 following the distortion compensation circuit 200. Where the distortion compensation circuit 200 is a postdistortion circuit, the intermodulation distortion products provide compensating postdistortion combined with the RF signal to compensate for the distortion already caused by one or more non-linear elements 272 located before the distortion compensation circuit 200.

The primary signal path 210 may include a delay element 216, such as a transmission line of a selected length, which delays the RF input signal on the primary signal path 210 to correspond to the delay caused by generating the compensating distortion on the secondary signal path 220. Such a delay helps to ensure that the compensating distortion on the secondary signal path 220 remains in phase with the RF input signal on the primary signal path 210.

According to one embodiment, the secondary signal path 220 may include parallel distortion sub-paths 222-0, 222-1 coupled at one end to splitter 230 and coupled at the other end to a combiner 232. The distortion sub-path 222-0 produces intermodulation distortion products that are not dependent on frequency (i.e., frequency independent distortion products) and the distortion sub-path 222-1 produces intermodulation distortion products that are dependent on frequency (i.e., frequency dependent distortion products). In particular, distortion may be represented as a time dependent series including distortion terms of different orders of magnitude with the distortion sub-path 222-0 corresponding to the zero order distortion term, which is frequency independent, and the distortion sub-path 222-1 corresponding to the first order distortion term, which is frequency dependent. Providing distortion compensation based on orders of time dependent series representing distortion is described in greater detail in U.S. patent application Ser. No. 12/025,883 entitled DISTORTION COMPENSATION CIRCUIT AND METHOD BASED ON ORDERS OF TIME DEPENDENT SERIES OF DISTORTION SIGNAL, which is filed concurrently herewith and is incorporated herein by reference.

The parallel distortion sub-paths 222-0, 222-1 may include distortion generators 224-0, 224-1 that generate the intermodulation distortion products from the RF input signal. In a distortion compensation circuit that compensates for CSO distortion, the distortion generators 224-0, 224-1 are CSO distortion generators including a square law device that generates second order intermodulation products, as will be described in greater detail below. A CSO distortion generator (or second order distortion generator) does not necessarily generate only second order distortion. A CSO distortion generator (or second order distortion generator) may include a distortion generator that produces even-order distortion with predominantly second order distortion. In a distortion compensation circuit that compensates for odd orders of distortion, other distortion generators may be used such as CTB distortion generators to compensate for CTB distortion. A CTB distortion generator may include a distortion generator that produces odd-order distortion with predominantly third order distortion.

To produce the frequency dependent distortion products, the frequency dependent distortion sub-path 222-1 may further include a d/dt differentiating filter 226-1 after the distortion generator 224-1. The d/dt differentiating filter 226-1 may be a simple capacitor having a capacitance capable of providing the desired d/dt function without blocking too much magnitude of the distortion. For example, the capacitor of the d/dt differentiating filter 226-1 may have a capacitance between 0.5 pF and 5 pF, and more specifically about 2 pF for a secondary path with 50 ohms impedance. This value gives a reasonable approximation of a d/dt filter over a reasonably wide bandwidth. A broadband impedance match is not required in this case because the d/dt differentiating filter 226-1 is isolated between the amplifier 228-1 and the CSO generator 224-1.

One or both of the distortion sub-paths 222-0, 222-1 may also include a signal controlled phase inverter 225-0, 225-1 to invert the phase of the distortion products in either or both of the distortion sub-paths 222-0, 222-1. Providing signal controlled phase inverters 225-0, 225-1 in each of the sub-paths 222-0, 222-1 allows independent 180° phase change of each of the sub-paths 222-0, 222-1. The signal controlled phase inverter 225-0, 225-1 may be responsive to a phase inversion control signal (e.g., provided by controller 160 shown in FIG. 1) to select a phase of either 0° or 180°. In other embodiments, a controllable phase inverter may be used and controlled in other ways such as by a manual switch or some other control mechanism (e.g., changing placement of circuit components).

The signal controlled phase inverters 225-0, 225-1 may also be located in other locations along the sub-paths 222-0, 222-1 other than directly following the distortion generators 224-0, 224-1. The primary signal path 210 may also include a signal controlled phase inverter (not shown) to provide controllable phase inversion of the RF signal in the primary signal path 210. Although the exemplary embodiment with signal controlled phase inverters 225-0, 225-1 in each of the sub-paths 222-0, 222-1 provides total control over the phase inversion of the distortion, the distortion compensation circuit may also include a signal controlled phase inverter in only one of the sub-paths 222-0, 222-1 for partial control.

One or both of the distortion sub-paths 222-0, 222-1 of the secondary signal path 220 may also include one or more gain control elements, such as a variable attenuator 227-0, 227-1 and/or an amplifier 228-0, 228-1, before and/or after the distortion generators 224-0, 224-1 to control a magnitude of the compensating distortion generated by the distortion generators 224-0, 224-1. Variable gain control elements help to ensure that the magnitude of the compensating distortion corresponds sufficiently to the magnitude of the distortion being compensated. The variable attenuators 227-0, 227-1 may be PIN attenuators and may receive attenuation control signals from a controller (e.g., controller 160 shown in FIG. 1) to adjust the attenuation as needed. One or both of the distortion sub-paths 222-0, 222-1 of the secondary signal path 220 may also include delay components 234-0, 234-1 to add small amounts of delay in each sub-path 222-0, 222-1 to "zero" out any path length differences.

Figure 3:
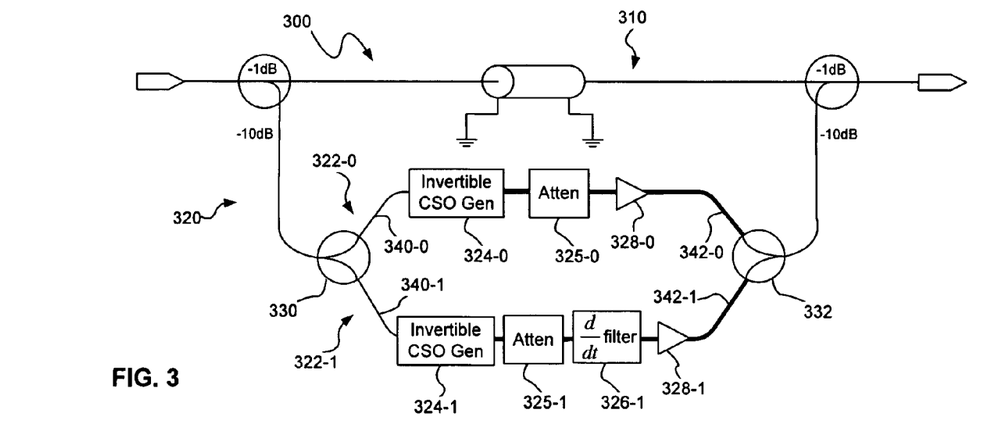
FIG. 3 is a schematic diagram of a distortion compensation circuit including an invertible distortion generator, consistent with another embodiment of the invention.
Figure 8:
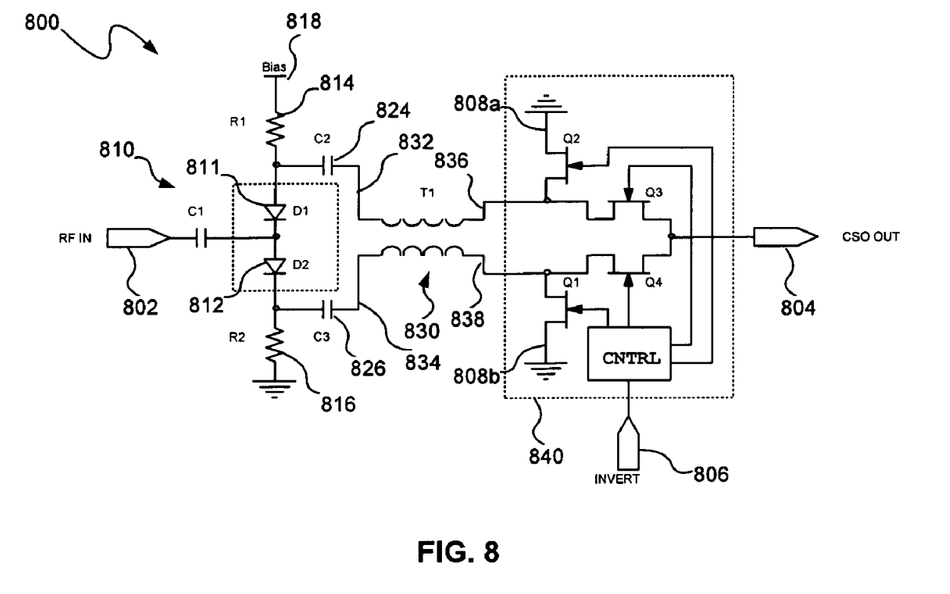
FIG. 8 is a schematic diagram of one embodiment of an invertible distortion generator that may be used in a distortion compensation circuit.

Referring to FIG. 3, an embodiment of a predistortion circuit 300 is shown and described. The predistortion circuit 300 includes a primary signal path 310 coupled to a secondary signal path 320 similar to the predistortion circuit 200 described above. According to this embodiment, a distortion generator and signal controlled phase inverter are combined as an invertible distortion generator 324-0, 324-1 in each of the parallel distortion sub-paths 322-0, 322-1, which are coupled together with splitter 330, such as a 3 dB splitter, and combiner 332, such as a 3 dB combiner. One embodiment of an invertible CSO distortion generator is shown in FIG. 8 and described in greater detail below. This embodiment of the predistortion circuit further includes a d/dt differentiating filter 326-1 in the frequency dependent sub-path 322-1 and attenuators 325-0, 325-1 and amplifiers 328-0, 328-1 in each of the sub-paths 322-0, 322-1, as described above. Although the exemplary embodiment shows invertible CSO distortion generators 324-0, 324-1 in each of the sub-paths 322-0, 322-1, an invertible distortion generator may be provided in only one of the sub-paths with a non-invertible distortion generator in the other path to provide partial control over phase inversion of the generated predistortion. Also, other types of distortion generators (e.g., CTB distortion generators) may be invertible.

According to this embodiment of the predistortion circuit 300, the impedance in the portions 342-0, 342-1 of the sub-paths 322-0, 322-1 after the invertible CSO distortion generators 324-0, 324-1 is lower than the impedance in the portions 340-0, 340-1 of the sub-paths 322-0, 322-1 before the invertible CSO generators 324-0, 324-1. In one embodiment, the impedance is 75 ohms in the primary signal path 310 and a portion of the secondary signal path 320 but changes from 75 ohms to 50 ohms after the CSO generators 324-0, 324-1 and before the combiner 332. This change in impedance may provide better magnitude-phase versus frequency characteristics from the CSO generator and may enable the use of lower cost amplifiers 328-0, 328-1 in the secondary path. The combiner 332 used to combine the sub-paths 322-0, 322-1 at the lower impedance portions 342-0, 342-1 may be an integrated 3 dB combiner/impedance transformer, which eliminates the need for a match pad to match impedance. A 50 ohm combiner and match pad may also be used, but a 3 dB combiner/impedance transformer provides less loss than a 50 ohm combiner and match pad. Although the predistortion circuit 300 is shown in FIG. 3 with this impedance change, other predistortion circuits described herein may also include these impedance characteristics.

Figure 4:
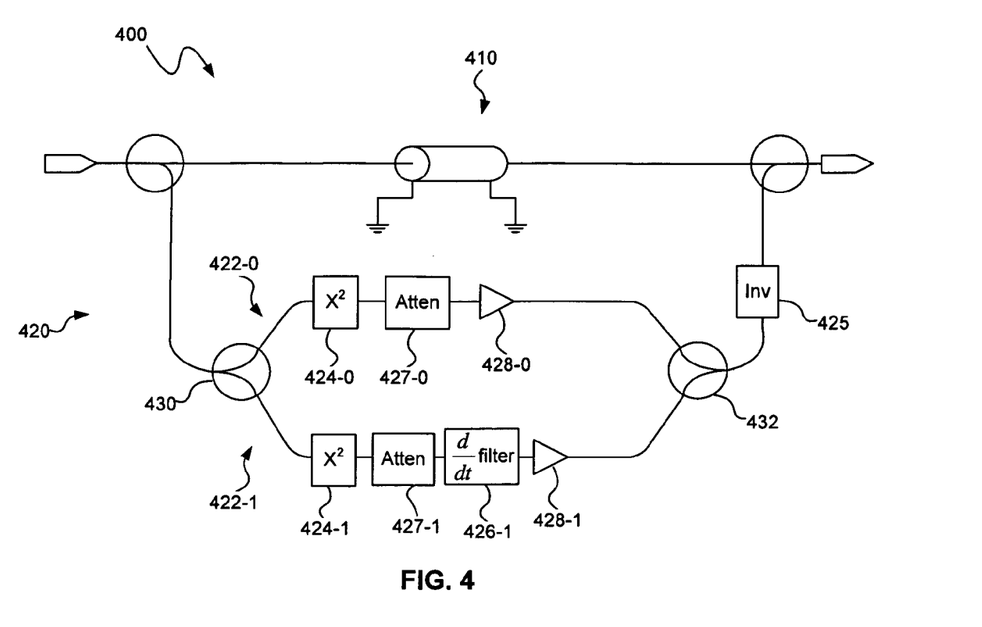
FIG. 4 is a schematic diagram of a distortion compensation circuit including an invertible distortion path, consistent with a further embodiment of the present invention.

FIG. 4 shows a further embodiment of a predistortion circuit 400. The predistortion circuit 400 includes a primary signal path 410 coupled to a secondary signal path 420 similar to the predistortion circuit 200 described above. The secondary signal path 420 includes a frequency independent distortion sub-path 422-0 coupled to a frequency dependent distortion sub-path 422-1 at a splitter 430 and combiner 432 without signal controlled phase inverters located in the sub-paths 422-0, 422-1. According to this embodiment, a signal controlled phase inverter 425 may be located in other locations on the secondary signal path 420 outside of the sub-paths 422-0, 422-1, for example, following the combiner 432. A single inverter in this location may be sufficient in some applications where independent phase inversion of the frequency independent and frequency dependent path are not required. The predistortion circuit 400 may also include attenuators 427-0, 427-1 and amplifiers 428-0, 428-1 in one or both sub-paths 422-0, 422-1, as described above.

Figure 5:
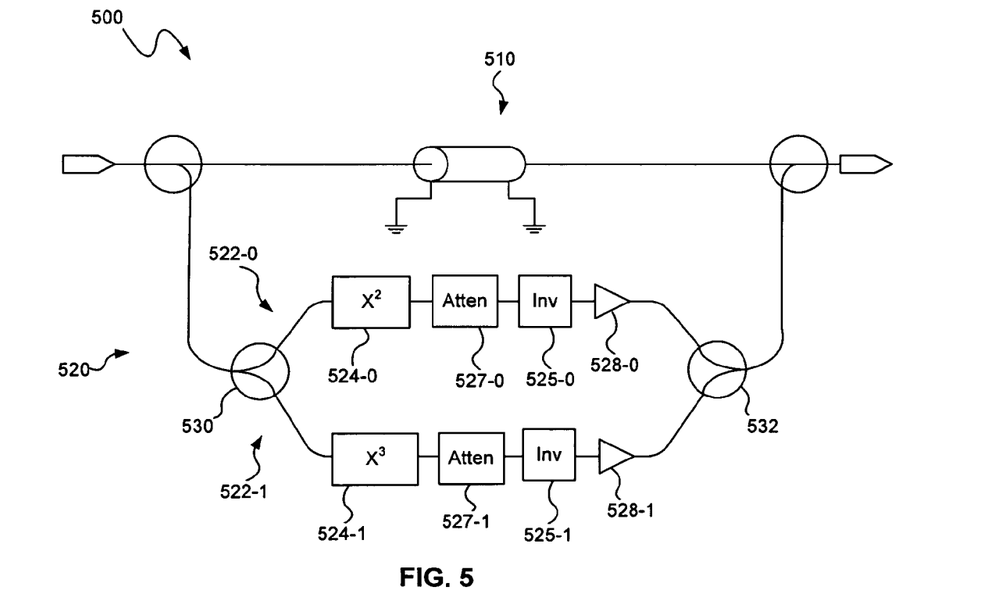
FIG. 5 is a schematic diagram of a distortion compensation circuit including signal controlled inverters in various locations, consistent with further embodiments of the present invention.

FIG. 5 shows another embodiment of a predistortion circuit 500. The predistortion circuit 500 includes a primary signal path 510 coupled to a secondary signal path 520 similar to the predistortion circuit 200 described above. The secondary signal path 520 includes parallel distortion sub-paths 522-0, 522-1 coupled at splitter 530 and combiner 532. According to this embodiment, the distortion sub-paths include distortion generators 524-0, 524-1 that produce different orders of intermodulation distortion products. For example, the distortion generator 524-0 in the first sub-path 522-0 may be a CSO distortion generator that generates second order intermodulation distortion products and the distortion generator 524-1 in the second sub-path 522-1 may be a CTB distortion generator that generates third order intermodulation distortion products. Signal controlled phase inverters 525-0, 525-1 in each of the sub-paths 522-0, 522-1 allow the phases of the CSO distortion and the CTB distortion to be independently invertible. This embodiment of the predistortion circuit 500 may further include additional sub-paths to provide both frequency independent and frequency dependent CSO and CTB distortion products. The predistortion circuit 500 may also include attenuators 527-0, 527-1 and amplifiers 528-0, 528-1 in one or both sub-paths 522-0, 522-1, as described above.

Figure 6:
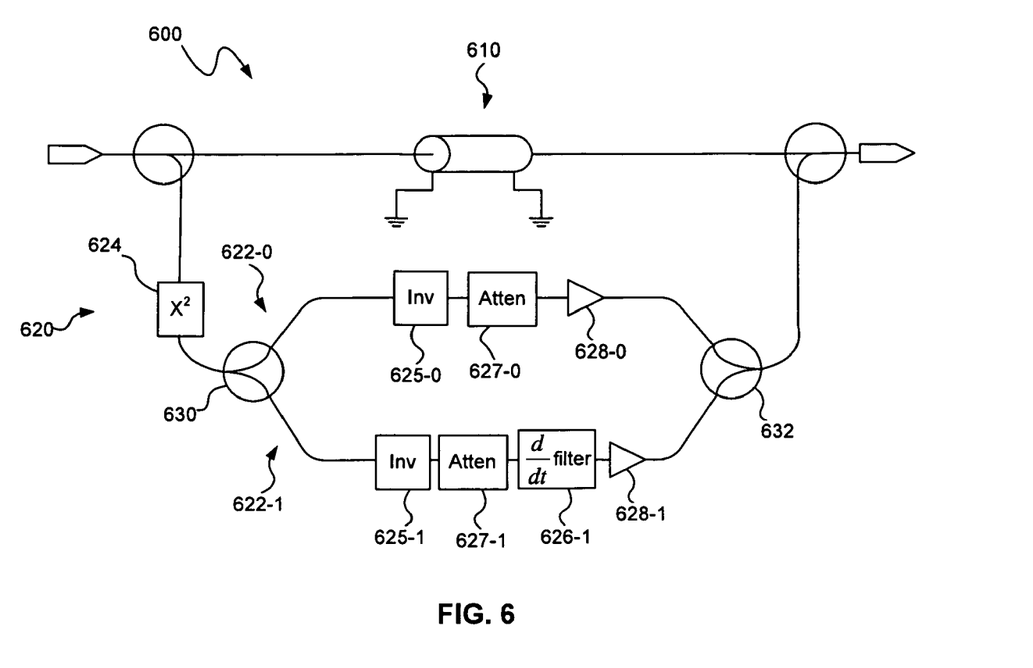
FIG. 6 is a schematic diagram of a distortion compensation circuit including invertible distortion paths, consistent with yet another embodiment of the present invention.

FIG. 6 shows yet another embodiment of a predistortion circuit 600. The predistortion circuit 600 includes a primary signal path 610 coupled to a secondary signal path 620 similar to the predistortion circuit 200 described above. The secondary signal path 620 includes a frequency independent distortion sub-path 622-0 coupled to a frequency dependent distortion sub-path 622-1 at splitter 630 and combiner 632. According to this embodiment, a distortion generator 624, such as a CSO distortion generator, is located in the secondary signal path 620 before the splitter 630. The distortion products generated by the distortion generator 624 are then filtered by the d/dt differentiating filter 626-1 on the frequency dependent sub-path 622-1 but are not filtered on the frequency independent sub-path 622-0. One or more of the sub-paths 622-0, 622-1 may also include signal controlled phase inverters 625-0, 625-1 to invert the phase of the distortion products on the respective sub-path(s) 622-0, 622-1. The predistortion circuit 600 may also include attenuators 627-0, 627-1 and amplifiers 628-0, 628-1 in one or both sub-paths 622-0, 622-1, as described above.

Figure 7:
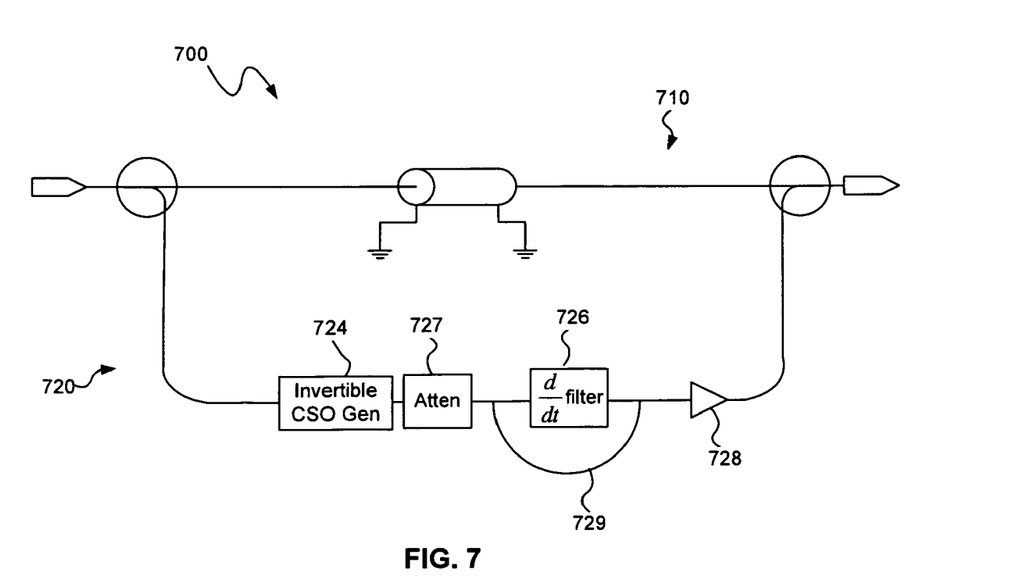
FIG. 7 is a schematic diagram of a distortion compensation circuit including a single path with an invertible distortion generator, consistent with a further embodiment of the present invention.

FIG. 7 shows another embodiment of a predistortion circuit 700. The predistortion circuit 700 includes a primary signal path 710 coupled to a secondary signal path 720 similar to the predistortion circuit 200 described above. According to this embodiment, the secondary signal path 720 includes an invertible CSO distortion generator 724 and a d/dt differentiating filter 726 with a bypass 729. Thus, the predistortion circuit 700 provides both frequency independent distortion and frequency dependent distortion on a single path without separate parallel distortion sub-paths, although the frequency dependent distortion and frequency independent distortion may not be independently inverted. The predistortion circuit 700 may also include an attenuator 727 and an amplifier 728 on the path 720, as described above.

Figure 7A:
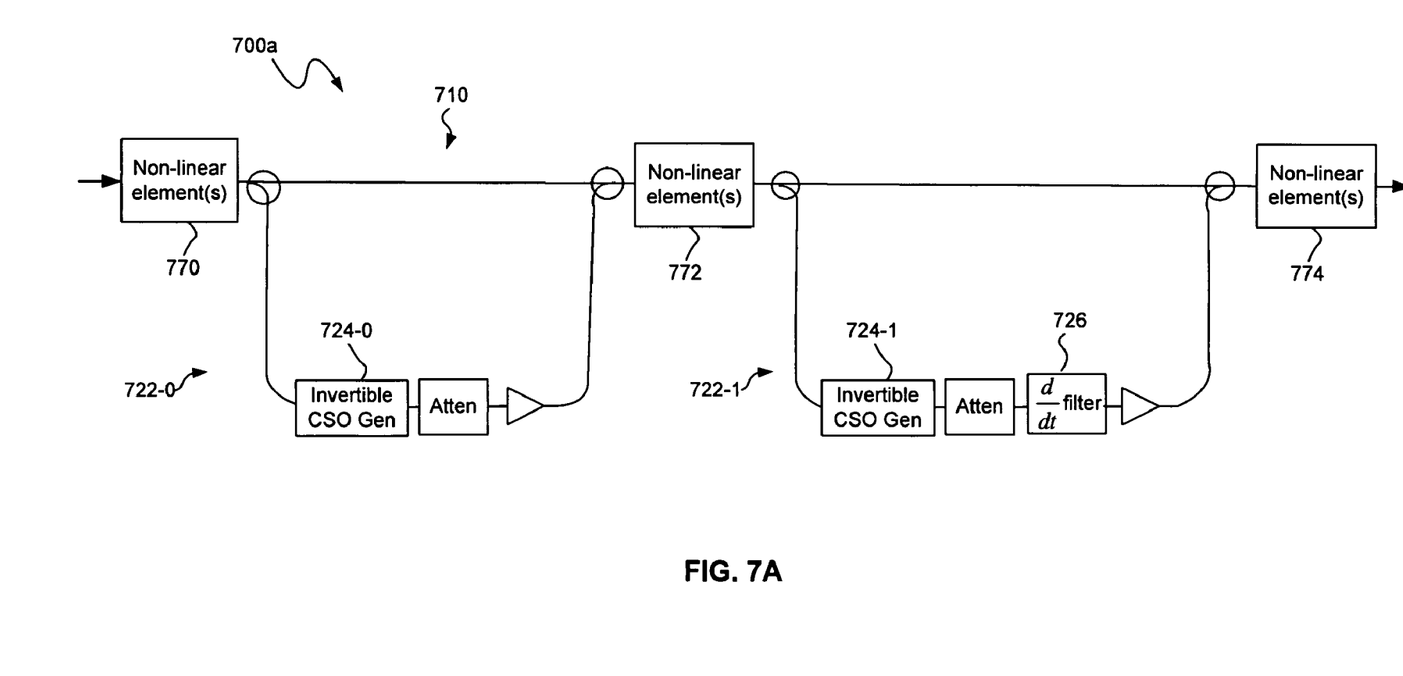
FIG. 7A is a schematic diagram of a distortion compensation system including separate distortion sub-paths in series, consistent with yet another embodiment of the present invention.

FIG. 7A shows a distortion compensation system 700a consistent with yet another embodiment. The distortion compensation system 700a includes a primary path 710 and secondary distortion compensation sub-paths 722-0, 722-1 in series instead of in parallel. The non-linear element(s) 770, 772, 774 that generate the distortion to be compensated may be located before, after or between the sub-paths 722-0, 722-1. One or both of the sub-paths 722-0, 722-1 may include an invertible CSO distortion generator 724, or a separate distortion generator and inverter as described above. As described above, the sub-path 722-0 may be frequency independent and the sub-path 722-1 may be frequency dependent and may include the differentiating d/dt filter 726. In other embodiments, one of the sub-paths may provide even order distortion compensation and one of the sub-paths may provide odd order distortion compensation.

In one embodiment, the distortion compensation system 700a may be distributed with the secondary distortion compensation sub-paths 722-0, 722-1 in separate locations. For example, the frequency independent sub-path 722-0 may be located in a transmitter and the frequency dependent sub-path 722-1 may be located in a receiver, or vice versa. Thus, the secondary distortion compensation sub-path 722-0 may provide predistortion compensation while the secondary distortion compensation sub-path 722-1 may provide postdistortion compensation.

Although the exemplary embodiments show distortion compensation circuits with secondary paths that either have no frequency dependence or are filtered with a d/dt filter, the use of inverters or invertible CSO generators in the secondary path or inverting the fundamental path is not limited only to those implementations. Inverters or invertible CSO generators or inverting the fundamental path relative to the secondary path may have application, for example, where the frequency dependence in one or more of the secondary paths are arbitrary or in a situation where more than two secondary paths exists and where each secondary path has a different frequency dependence. An inverter in the secondary path or invertible CSO generator or inverting the fundamental path relative to the secondary path has particular application in a situation where three or more secondary paths exist whereby each path is designed to compensate for one term in the Taylor series expansion for time dependent second-order non-linearities. In this case, the invert capabilities may allow for compensation of each of the terms whether the terms are positive or negative.

One embodiment of an invertible CSO generator 800 is shown in greater detail in FIG. 8. The invertible CSO generator 800 may be used in distortion compensation circuits described herein (e.g., the predistortion circuits 300, 700 shown in FIGS. 3 and 7) or in other multiple path or single path distortion compensation circuits. The invertible CSO generator 800 receives the RF input signal at an input 802, generates second order intermodulation products from the RF input signal, and provides the second order intermodulation products (i.e., the CSO distortion) at an output 804.

The invertible CSO generator 800 may include a CSO distortion generator portion 810 including diodes 811, 812 connected and arranged to generate the CSO distortion. One example of the diodes 811, 812 is a matched series pair of Schottky diodes. The diodes 811, 812 are connected and arranged relative to the RF input such that RF voltage drop across the diodes 811, 812 are opposite relative to the polarity of the diode. The RF currents through the diodes are then added by use of a balun 830 or other similar devices which block common mode or odd-order signals, but adds differential or even-order signals. Thus, odd order components of the current from the diodes 811, 812 are effectively blocked, but even order components are passed. Although the exemplary embodiment shows one arrangement of a series pair of diodes, other arrangements and numbers of diodes are possible such that the diodes are capable of producing distortion corresponding to the distortion to be compensated.

The CSO generator portion may also include bias resistors 814, 816 coupled in series with the diodes 811, 812. A DC bias voltage coupled to the network of diodes 811, 812 and bias resistors 814, 816 results in a bias current ($I_b$) across the diodes 811, 812. In general, the diodes 811, 812 are biased to operate in the forward bias region when generating distortion. The bias resistors are chosen along with bias current to provide, among other things, good input impedance match. The diode bias may be set manually by an on-board variable resistor (not shown). In other embodiments, an adjustable bias control may adjust the bias current ($I_b$) provided to the diodes 811, 812 to control, among other things, compensating distortion magnitude, for example, as described in greater detail in U.S. patent application Ser. No. 11/834,873, which is fully incorporated herein by reference. Although the exemplary embodiment shows one configuration and arrangement of the bias resistors together with the diodes, other configurations and bias resistor networks are possible to provide a desired bias current across the diodes. The CSO generator portion 810 may also include DC blocking capacitors 824, 826 coupled to the diodes 811, 812, respectively, to isolate the DC bias signals from RF signals.

The output of the balun 830 may be connected to an RF switching device 840 to provide phase inversion capabilities. The phase inversion state of the even-order distortion passing through the balun 830 to the output 804 depends on which of the output terminals 836, 838 is coupled to the output 804 and which of the output terminals 836, 838 is coupled to ground 808a, 808b.

The switching device 840 is coupled to the output terminals 836, 838 of the balun 830 and selects which side of the balun 830 to tap off of in response to a phase inversion control signal received at control signal input 806. For example, when the switching device 840 invert control signal input 806 is low, the balun terminal 836 may be coupled to output 804 and the balun terminal 838 may be coupled to ground 808b providing a phase of 0°. When the switching device 840 invert control signal input 808 is high, the switching device 840 causes the balun terminal 836 to be coupled to ground 808a and causes the balun terminal 838 to be coupled to output 804 providing in a phase change of 180°. In other words, the switching device 840 causes the balun 830 to invert the distortion provided to the output 804 in response to an inversion control signal.

The switching device 840 may be a solid state RF switch as shown. The switching device 840 may also be implemented using other discrete devices, such as a RF relay or a RF MEMS (microelectromechanical system) switch. The control signal input 806 of the switching device 840 may be coupled to a controller (e.g., controller 160 shown in FIG. 1), which provides the phase inversion control signal as a digital output signal based on various parameters, as described in greater detail below. The controller may include firmware configured to generate the phase inversion control signal in response to various parameters affecting distortion in a system, such as temperature, bias current, and fiber length, as described in greater detail below. Thus, the controller or microprocessor may control distortion compensation in response to the various parameters.

In other embodiments, distortion generating diodes in the distortion generator may control the phase of the generated distortion. For example, the distortion generator may include two sets of diodes connected to generate distortion of opposite phase. The diodes may be biased such that the distortion from one set of diodes dominates. By changing which set of diodes is biased to dominate, the phase of the distortion generated by the distortion generator may be effectively flipped or inverted. Such an embodiment may eliminate the need for the RF switch to invert the phase and further integrates the phase control into the distortion generator.

Figure 9:
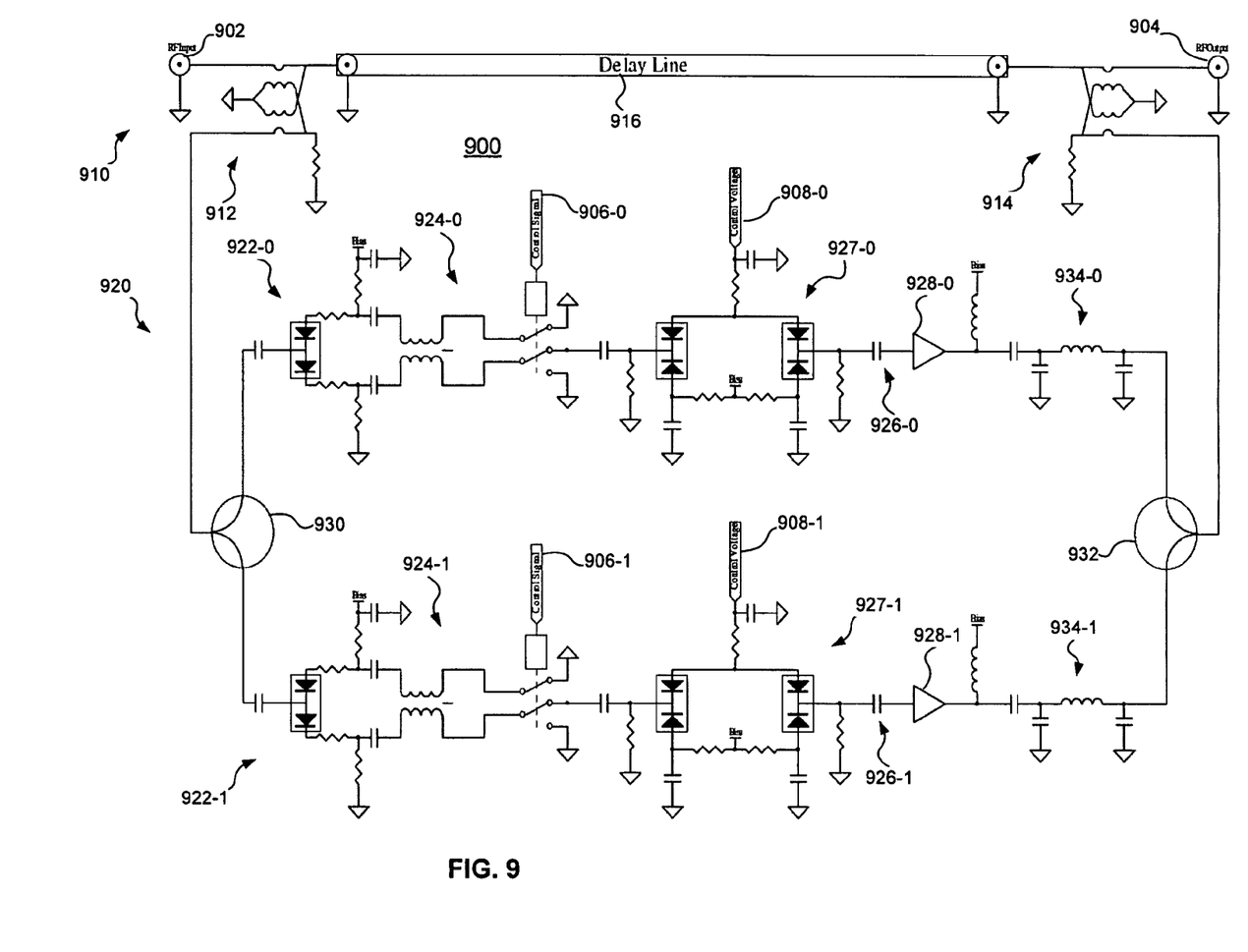
FIG. 9 is a schematic diagram of a predistortion circuit, consistent with yet another embodiment of the present invention.

Referring to FIG. 9, one implementation of a predistortion circuit 900, consistent with an embodiment of the present invention, is shown in greater detail. This embodiment of the predistortion circuit 900 includes an RF input 902 and an RF output 904 and primary and secondary signal paths 910, 920. The primary signal path 910 may be coupled to the secondary signal path 920 at directional couplers 912, 914 and may include a delay line 916. The secondary signal path 920 includes distortion sub-paths 922-0, 922-1 coupled to a splitter 930 and a combiner 932. Each of the sub-paths 922-0, 922-1 include invertible CSO distortion generators 924-0, 924-1, PIN attenuators 927-0, 927-1, amplifiers 928-0, 928-1 and delay components 934-0, 934-1 (e.g., capacitors and inductors). The sub-path 922-1 further includes a 2 pF capacitor 926-1, which acts as the d/dt filter, while the sub-path 922-0 includes a 100 nF capacitor 926-0, which does not provide any filtering. The invertible CSO distortion generators 924-0, 924-1 may include phase inversion control inputs 906-0, 906-1 coupled to a microprocessor (not shown), and the PIN attenuators 927-0, 927-1 may include attenuator control inputs 908-0, 908-1 coupled to the microprocessor. Other implementations of the predistortion circuit and the invertible distortion generator are also possible consistent with the embodiments described herein.

Figure 10:
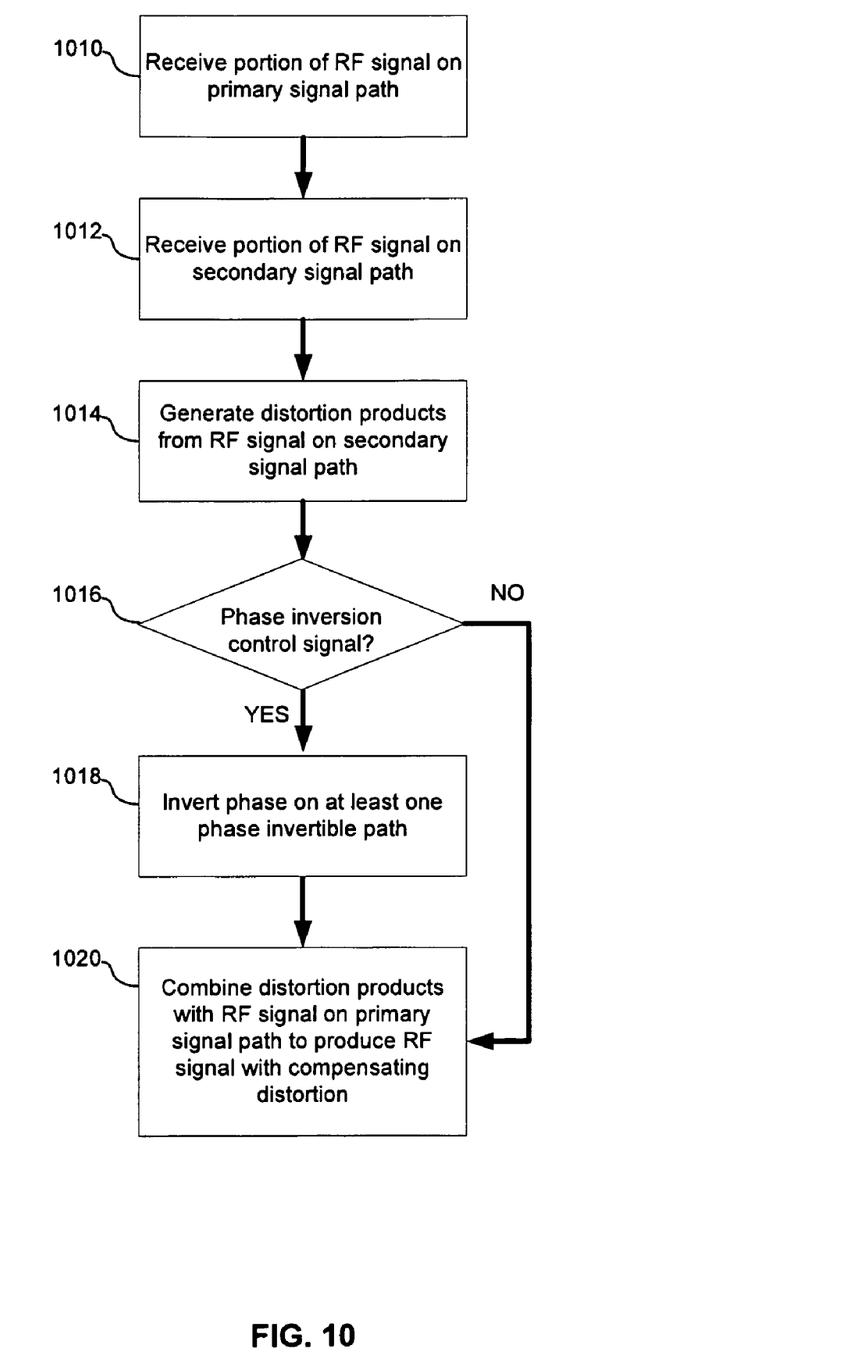
FIG. 10 is a flow chart illustrating one method of compensating for distortion produced by a non-linear element, consistent with one embodiment of the present invention.

FIG. 10 illustrates one method of compensating for distortion generated by one or more non-linear elements, such as a laser in an optical transmitter. This method may be performed using a distortion compensation circuit according to any of the configurations described above or using other distortion compensation circuits including a phase invertible path. In one exemplary embodiment where a laser is used in a laser transmitter designed for forward path CATV applications, the method may be used to compensate for distortion produced by a laser directly modulated with a multi-channel RF signal including frequencies as high as 1 GHz.

The exemplary method includes receiving 1010 a portion of the RF signal on a primary signal path and receiving 1012 a portion of the RF signal on a secondary signal path. Distortion products may then be generated 1014 on the secondary signal path. The distortion products may include, for example, second order intermodulation distortion products generated by a CSO distortion generator. Generating distortion products may also include generating both frequency independent and frequency dependent distortion products. Generating distortion products may further include generating distortion products on multiple sub-paths of the secondary signal path as described above.

The exemplary method also includes determining 1016 if a phase inversion control signal is received. The phase inversion control signal may be generated by a controller or microprocessor based on various parameters. The parameters may include static parameters that are known to affect the distortion in the output signal from the non-linear amplifier. In an optical system, for example, one such static parameter affecting distortion is the fiber length of an optical fiber coupled to a laser. Another static parameter affecting distortion may be the type of optical transmitter. In dense wavelength division multiplexed (DWDM) transmitters, for example, RF inverted boards may be used and sometimes produce CSO distortion with 180° opposite phase. If these static parameters are determined to require phase inversion in any of the phase invertible paths of the distortion compensation circuit, the controller or microprocessor may be programmed to provide the phase inversion control signal(s) to the appropriate phase inverter and/or invertible distortion generator.

The phase inversion control signal may also be generated by a controller or microprocessor based on dynamic parameters that change during operation to affect the distortion in the output signal from the non-linear amplifier. In an optical system, for example, dynamic parameters affecting distortion may include bias current and temperature. The controller or microprocessor may receive and/or monitor these parameters, determine when the parameter affects the system distortion in a way that would require phase inversion in any of the phase invertible paths, and provide the phase inversion control signal(s) to the appropriate phase inverter and/or invertible distortion generator. With respect to temperature, for example, the controller or microprocessor may have a temperature input coupled to a temperature sensor that measures temperatures (e.g., within a range of about −20° C. to 65° C.). The controller or microprocessor may also include firmware that determines when a temperature change requires phase inversion and causes the phase inversion control signal to be generated in response to such changes. Of course, the controller or microprocessor may also control other aspects of the distortion on the secondary signal path, such as the magnitude of the distortion (e.g., by controlling the attenuation).

If the phase inversion control signal is received (e.g., by a signal controlled phase inverter and/or an invertible distortion generator), the phase of the signal on at least one of the phase invertible paths is inverted 1018. For example, the phase of the distortion products generated on the secondary path or sub-path may be inverted. The compensating distortion products are then combined 1020 with the RF signal on the primary signal path to provide compensating predistortion and/or compensating postdistortion. If the phase inversion signal is not received, the compensating distortion products are combined 1020 with the RF signal on the primary signal path without inverting the distortion products. The compensating distortion combined with the RF signal compensates for the distortion generated by one or more non-linear elements. A predistorted RF signal, for example, may be provided to the non-linear element such that the distortion generated by the non-linear element is compensated.

Although an exemplary method of compensating for distortion is shown and described above, those skilled in the art will recognize that variations of this method are possible and within the scope of the present invention. For example, one or more acts of the method of distortion compensation may be performed in a different sequence or may be eliminated. Also, one or more additional acts may be performed in addition to or instead of those described above.

Accordingly, the distortion compensation circuits, invertible distortion generators and methods described herein may significantly improve distortion compensation and control over distortion compensation of non-linear elements, such as lasers and optical fibers in optical systems. Consistent with one embodiment, a distortion compensation circuit for compensating for distortion produced by at least one non-linear element includes a primary signal path configured to carry at least a portion of the magnitude of an input signal and at least one secondary signal path coupled to the primary signal path. The secondary signal path is configured to receive at least a portion of the input signal, to generate distortion, and to add at least a portion of the generated distortion back into the primary signal path. The distortion compensation circuit further comprises at least one controllable phase inverter located in the primary signal path, in the at least one secondary signal path, or in both paths. The at least one controllable phase inverter is configured to invert the phase of the respective signal on the respective path.

Consistent with another embodiment, an optical transmitter includes a RF signal input configured to provide a RF input signal and a predistortion circuit configured to receive the RF input signal and to generate a predistorted RF input signal. The predistortion circuit includes a primary signal path configured to receive at least a portion of the RF input signal and a secondary signal path coupled to the primary signal path and configured to receive at least a portion of the input signal. The secondary signal path includes at least one distortion generator configured to produce intermodulation distortion products from the RF input signal on the secondary path and at least one signal controlled phase inverter configured to invert the intermodulation distortion products produced by the distortion generator in response to a phase inversion control signal. The optical transmitter further includes a laser configured to receive the predistorted RF input signal and to generate a modulated optical output, wherein the predistorted RF input signal compensates for distortion generated by at least the laser, and a controller coupled to the predistortion circuit and configured to generate the phase inversion control signal.

Consistent with a further embodiment, an invertible distortion generator includes a RF input configured to receive a RF input signal and a distortion output configured to provide a distortion signal generated from the RF input signal. The invertible distortion generator also includes a distortion generator portion configured to generate intermodulation distortion products from the RF input signal and a balun including first and second input terminals coupled to the distortion generator portion and first and second output terminals configured to be coupled to either ground or to the distortion output. A phase of the distortion provided on the distortion output from the second output terminal is inverted relative to a phase of the distortion provided on the distortion output from the first output terminal. The invertible distortion generator further includes a switching unit coupled to the balun. The switching unit is configured to, in response to a phase inversion control signal, couple one of the first and second output terminals to ground and the other of the first and second output terminals to the distortion output.

Consistent with yet another embodiment, a method is provided for compensating for distortion produced by at least one non-linear element. The method includes: providing a distortion compensation circuit including a primary signal path and a secondary signal path coupled to the primary signal path; receiving a portion of a RF signal on the primary signal path; receiving a portion of a RF signal on the secondary signal path; generating distortion from the RF signal on the secondary signal path; generating a phase inversion control signal in response to at least one parameter; inverting a phase of a signal on at least one of the paths in response to the phase inversion control signal; and combining the intermodulation distortion products on the secondary signal path with the RF signal on the primary path to produce the RF signal with compensating distortion.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A distortion compensation circuit for compensation of distortion produced by at least one non-linear element, the distortion compensation circuit comprising:
   a primary signal path configured to carry at least a portion of the magnitude of an input signal;
   at least one secondary signal path coupled to the primary signal path, the secondary signal path being configured to receive at least a portion of the input signal, to generate distortion, and to add at least a portion of the generated distortion back into the primary signal path; and
   at least one signal controlled phase inverter located in the primary signal path, in the at least one secondary signal path, or in both paths, the at least one signal controlled phase inverter being configured to invert the phase of the respective signal on the respective path in response to a phase inversion control signal.

2. The distortion compensation circuit of claim 1 wherein the secondary signal path is configured to generate even order distortion.

3. The distortion compensation circuit of claim 1 further comprising at least one distortion generator configured to generate distortion products from the input signal on the secondary path, and wherein the at least one signal controlled phase inverter is located in the at least one secondary signal path and configured to invert the distortion products produced by the distortion generator in response to the phase inversion control signal.

4. The distortion compensation circuit of claim 3 wherein the distortion generator is a composite second order (CSO) distortion generator configured to produce second-order intermodulation distortion products from the input signal.

5. The distortion compensation circuit of claim 3 further comprising:
   a splitter coupling the primary signal path to the secondary signal path and configured to split the input signal into the portions received on the primary signal path and the secondary signal path; and
   a combiner coupling the primary signal path to the secondary signal path and configured to cause the distortion products on the secondary signal path to be combined with the input signal on the primary signal path.

6. The distortion compensation circuit of claim 3 wherein the signal controlled phase inverter is coupled directly to the distortion generator providing an invertible distortion generator.

7. The distortion compensation circuit of claim 6 wherein the signal controlled phase inverter includes a balun coupled to the distortion generator and a switching device coupled to the balun to control phase inversion.

8. The distortion compensation circuit of claim 3 wherein the secondary signal path includes at least one gain control element configured to adjust the magnitude of the distortion products.

9. The distortion compensation circuit of claim 3 wherein a portion of the secondary signal path after the distortion generator has an impedance lower than an impedance of a portion of the secondary signal path before the distortion generator.

10. The distortion compensation circuit of claim 3 wherein the primary signal path includes a signal controlled phase inverter responsive to a phase inversion control signal.

11. The distortion compensation circuit of claim 3 wherein the secondary signal path includes first and second distortion sub-paths, wherein the first distortion sub-path produces frequency independent distortion products, and wherein the second sub-path produces frequency dependent distortion products.

12. The distortion compensation circuit of claim 11 wherein the distortion sub-paths are coupled in parallel, and wherein the secondary signal path further comprises:
a splitter coupled to the first and second distortion sub-paths and configured to split the input signal on the secondary path into portions of the input signal received on the distortion sub-paths; and
a combiner coupled to the first and second distortion sub-paths and configured to combine the frequency independent distortion products on the first distortion sub-path with the frequency dependent distortion products on the second distortion sub-path.

13. The distortion compensation circuit of claim 12 wherein the distortion generator is located in the secondary signal path before the splitter.

14. The distortion compensation circuit of claim 11 wherein the first distortion sub-path comprises:
an even order distortion generator configured to produce even order intermodulation distortion products from the input signal on the secondary path;
a signal controlled phase inverter responsive to a control signal and configured to invert the even order intermodulation distortion products produced by the even order distortion generator on the first distortion sub-path; and
wherein the second distortion sub-path comprising:
an even order distortion generator configured to produce even order intermodulation distortion products from the input signal on the secondary path;
a signal controlled phase inverter responsive to a control signal and configured to invert the even order intermodulation distortion products produced by the even order distortion generator on the second distortion sub-path; and
a d/dt differentiating filter configured to differentiate the even order intermodulation distortion products generated by the even order distortion generator in the second distortion sub-path to produce the frequency dependent even order intermodulation distortion products.

15. The distortion compensation circuit of claim 14 wherein the d/dt differentiating filter includes a capacitor.

16. The distortion compensation circuit of claim 3 wherein the secondary signal path includes a d/dt differentiating filter following the distortion generator and a bypass around the d/dt differentiating filter such that the secondary signal path is configured to produce both frequency independent distortion products and frequency dependent distortion products.

17. The distortion compensation circuit of claim 3 wherein the secondary signal path includes first and second distortion sub-paths, wherein a distortion generator is located in each of the distortion sub-paths, and wherein at least one of the distortion sub-paths includes the at least one signal controlled phase inverter.

18. The distortion compensation circuit of claim 17 wherein the distortion sub-paths are coupled in parallel and configured to receive portions of the input signal received on the secondary signal path, and further comprising:
a splitter coupled to the first and second distortion sub-paths and configured to split the input signal on the secondary path into portions of the input signal received on the distortion sub-paths; and
a combiner coupled to the first and second distortion sub-paths and configured to combine the distortion products on the first distortion sub-path with the distortion products on the second distortion sub-path.

19. The distortion compensation circuit of claim 18 wherein the distortion sub-paths have a lower impedance between the distortion generators and the combiner.

20. The distortion compensation circuit of claim 19 wherein the distortion sub-paths have an impedance of about 50 ohms between the distortion generators and the combiner, and wherein the other portions of the secondary signal path and the primary signal path have an impedance of about 75 ohms.

21. The distortion compensation circuit of claim 1 wherein the at least one secondary path includes a distortion generator including at least two sets of diodes coupled to generate distortion of opposite phase, and wherein the sets of diodes are configured to be controllably biased such that one of the two sets of diodes dominates and the phase is invertible.

22. A method of compensating for distortion produced by at least one non-linear element, the method comprising:
providing a distortion compensation circuit including a primary signal path and at least one secondary signal path coupled to the primary signal path;
receiving a portion of a RF signal on the primary signal path;
receiving a portion of a RF signal on the at least one secondary signal path;
generating distortion from the RF input signal on the secondary signal path;
generating a phase inversion control signal in response to at least one parameter;
inverting a phase of a signal on at least one of the paths in response to the phase inversion control signal; and
combining the distortion on the secondary signal path with the RF signal on the primary path to produce the RF signal with compensating distortion.

23. The method of claim 22 wherein the parameter is temperature.

24. The method of claim 23 further comprising monitoring temperature and determining if changes in temperature affect phase of distortion produced by the non-linear amplifier, and wherein the phase inversion control signal is generated if the changes in temperature require phase inversion of the distortion produced on the secondary signal path.

25. The method of claim 22 wherein the non-linear element includes a laser, wherein the RF signal with compensating distortion is a predistorted RF signal, and further comprising providing the predistorted RF signal to the laser.

26. The method of claim 22 wherein generating the distortion includes generating at least second order intermodulation distortion products.

27. The method of claim 22 wherein the secondary signal path includes at least first and second distortion sub-paths, and wherein inverting the phase includes inverting distortion independently on at least one of the distortion sub-paths.

28. A distortion compensation circuit for compensation of distortion produced by at least one non-linear element, the distortion compensation circuit comprising:
- a primary signal path configured to carry at least a portion of the magnitude of an input signal;
- at least one secondary signal path coupled to the primary signal path, the secondary signal path being configured to receive at least a portion of the input signal, to generate distortion, and to add at least a portion of the generated distortion back into the primary signal path;
- at least one distortion generator configured to generate distortion products from the input signal on the secondary path;
- at least one signal controlled phase inverter located in the at least one secondary signal path and configured to invert the phase of the distortion products produced by the distortion generator in response to a control signal; and
- wherein the secondary signal path includes a d/dt differentiating filter following the distortion generator and a bypass around the d/dt differentiating filter such that the secondary signal path is configured to produce both frequency independent distortion products and frequency dependent distortion products.

* * * * *